(12) United States Patent
Justel et al.

(10) Patent No.: US 7,935,273 B2
(45) Date of Patent: May 3, 2011

(54) METHOD LIGHT EMITTING DEVICE WITH A EU(III)-ACTIVATED PHOSPHOR AND SECOND PHOSPHOR

(75) Inventors: Thomas Justel, Witten (NL); Jan Broere, Veldhoven (NL); Jan Renier Marie Hochstenbach, Baexem (NL); Raymond Goertz, Eindhoven (NL)

(73) Assignee: LG Electronics Inc., Seoul (KR)

( * ) Notice: Subject to any disclaimer, the term of this patent is extended or adjusted under 35 U.S.C. 154(b) by 483 days.

(21) Appl. No.: 11/575,780

(22) PCT Filed: Sep. 20, 2005

(86) PCT No.: PCT/IB2005/053082
§ 371 (c)(1), (2), (4) Date: Mar. 22, 2007

(87) PCT Pub. No.: WO2006/035355
PCT Pub. Date: Apr. 6, 2006

(65) Prior Publication Data
US 2009/0200915 A1 Aug. 13, 2009

(30) Foreign Application Priority Data
Sep. 29, 2004 (EP) .................................. 04104773

(51) Int. Cl.
*C09K 11/77* (2006.01)
(52) U.S. Cl. .... 252/301.4 R; 252/301.4 P; 252/301.4 F; 313/487; 313/486; 313/485
(58) Field of Classification Search .................. 313/487, 313/485, 486; 252/301.4 R, 301.4 F, 301.4 P
See application file for complete search history.

(56) References Cited

U.S. PATENT DOCUMENTS

| | | | | |
|---|---|---|---|---|
| 3,649,867 | A * | 3/1972 | Chester et al. | 315/12.1 |
| 4,565,948 | A * | 1/1986 | Kimura et al. | 313/487 |
| 5,747,100 | A | 5/1998 | Petersen | |
| 5,801,483 | A * | 9/1998 | Watanabe et al. | 313/485 |
| 5,821,685 | A * | 10/1998 | Peterson | 313/467 |
| 6,042,747 | A | 3/2000 | Rao | |
| 6,559,598 | B2 * | 5/2003 | Justel et al. | 313/587 |
| 6,590,333 | B1 | 7/2003 | Suzuki et al. | |
| 6,982,046 | B2 * | 1/2006 | Srivastava et al. | 252/301.4 R |
| 2001/0024088 | A1 | 9/2001 | Justel et al. | |
| 2003/0230739 | A1 | 12/2003 | Comanzo et al. | |

FOREIGN PATENT DOCUMENTS

| | | |
|---|---|---|
| EP | 1441383 | 7/2004 |
| WO | 2004036962 A1 | 4/2004 |

* cited by examiner

*Primary Examiner* — C. Melissa Koslow
(74) *Attorney, Agent, or Firm* — Ked & Associates LLP

(57) ABSTRACT

This invention relates to a light emitting device based on a Xe or Xe/Ne excimer discharge, e.g. a full color display screen or a xenon excimer lamp, comprising a phosphor blend of a red-emitting Eu(III)-activated phosphor and an UVlight emitting phosphor. Full color plasma display panels (PDPs) according to the present invention comprising a phosphor blend of a red-emitting Eu(III)-activated phosphor and an UV-light emitting phosphor for the red pixels show an improved color point and a shorter decay time compared to the use of the respective single red emitting Eu(III) activated phosphor. Xenon excimer lamps for illumination purposes (e.g. for LCD backlighting or X-Ray image illumination) comprising a phosphor blend of a redemitting Eu(III) activated phosphor and an UV-light emitting phosphor show an improved color rendering. The invention is also related to a phosphor blend of a red-emitting Eu(III)-activated phosphor and an UV-light emitting phosphor.

7 Claims, 2 Drawing Sheets

METHOD LIGHT EMITTING DEVICE WITH A EU(III)-ACTIVATED PHOSPHOR AND SECOND PHOSPHOR

This invention relates to a light emitting device based on a Xe or Xe/Ne excimer discharge, e.g. a full colour plasma display (PDP) screen or xenon excimer lamp comprising a phosphor blend of a red-emitting europium(III)-activated phosphor and a second phosphor. The invention also relates to a phosphor blend.

In light emitting devices, which operate with a VUV-emitting gas discharge, as plasma display screens and xenon excimer lamps are, the phosphor blend constitute the last member of the energy-transfer chain, wherein electric energy is converted into visible light. VUV(vacuum-UV)-radiation is radiation with a wavelength below 200 nm. The efficiency of such light emitting device comprising a phosphor screen is decisively determined by how completely the generated VUV radiation is absorbed by the phosphor, the phosphor's conversion efficiency and how completely the subsequently generated visible light leaves the light source, e.g. the plasma display screen, in the direction of the observer.

Phosphors activated by europium(III) are applied in plasma display panels or trichromatic xenon discharge lamps as red-emitting components. At present most widely applied is $(Y,Gd)BO_3:Eu$ (YGBE), due to its high conversion efficiency for VUV radiation and its good stability under PDP or xenon lamp manufacturing and driving conditions. Although YGBE has the highest efficiency of all investigated red-emitting VUV phosphors, it has several serious drawbacks, which are intrinsic to the type of its host lattice. First of all it has a rather long decay time (8.5 ms), which is caused by the local inversion symmetry of the activator site. A long decay time can cause motion artefacts in emissive displays under 100 Hz operation. The high local symmetry of europium(III) in the activator site of the host lattice also implies that the emission spectrum of Eu(III) is rather orange, viz. a color point at x=0.643 and y=0.357. This is much less red than the colour point of $Y_2O_2S:Eu$ used in CRTs whose color point is at x=0.659 and y=0.332. The difference is caused by the strong $^5D_0\text{-}^7F_1$ (orange) emission line of YGBE, while $Y_2O_2S:Eu$ shows strong $^5D_0\text{-}^7F_{2,4}$ (red) transitions at 620 and 700 nm. Consequently, the search for alternative red line-emitting phosphors has been intensively pursued in recent years.

U.S. Pat. No. 6,042,747 discloses Eu(III) activated yttrium, gadolinium, alkaline earth borate phosphor particles with enhanced intensity of the red lines in the emission spectra, having the empirical formula $(Y_{1-x-y-z}Eu_xGd_yM_z)BO_3$ wherein: $0.01 \leq x \leq 0.1$; $0 \leq y \leq 0.5$; M=Mg, Ca, Sr, or Ba; and $0 \leq z \leq 0.1$. Also disclosed is a method for manufacturing such particles, which provides the phosphor in the form of a powder having a small particle size (0.1-2.0 microns) which displays improved brightness. The phosphors were excited by VUV radiation (147 and 173 nm) from a xenon excimer discharge lamp.

U.S. Pat. No. 6,590,333 discloses Eu(III)-activated phospho-vanadates as red phosphors for use in display systems and light emitting systems of the formula $(Y_{1-a-b}Gd_aEu_b)(P_cV_{1-c})O_4(MO_2)_d$ wherein M is at least one element selected from the group consisting of Si, Ge and Ti; and a, b, c and d are numbers in the following ranges: $0 < a \leq 0.90$, $0.03 \leq b \leq 0.60$, $0 < c \leq 0.95$ and $0.0014 < d \leq 0.0814$.

However the colour point of these phosphors is in general also shifted to the orange range in comparison to $Y_2O_2S:Eu$.

Eu(III)-activated phosphors can show a distinctly deeper red emission and a shorter decay time, if the activator is located onto a host lattice position, which has higher co-valence and a lower local symmetry. This situation is exemplified in $YVO_4:Eu$, $Y_2O_3:Eu$ or $Y(V_{1-x-y}P_xB_y)O_4:Eu$. These compounds are very efficient red phosphors with a good colour point under UV excitation in the wavelength range of 200-320 nm, but their quantum efficiency decreases substantially below 200 nm. The low conversion efficiency in the VUV range is unsatisfactory for the use in light emitting devices based on a Xe or Xe/Ne excimer discharge, e.g. as used in plasma display screens and xenon excimer lamps.

Therefore, it is an object of the invention to provide light emitting devices including a Xe or Xe/Ne discharge and a phosphor layer comprising a phosphor blend with improved chromaticity and colour rendition and a short decay time of the red pixels whereby the electro-optical efficiency is improved compared to the single red-emitting Eu(III)-activated phosphors.

In accordance with the present invention, this object is achieved by a light emitting device based on a Xe or Xe/Ne discharge, for example a plasma display screen or a xenon discharge lamp, with a phosphor layer comprising a red-emitting Eu(III) activated phosphor with a good colour point and colour saturation in a blend with at least one efficient UV-emitting$^{phosphor}$, which converts the VUV photons with a wavelength range <200 nm, emitted by the gas discharge, into UV photons with a wavelength range of 200 to 330 nm, which in turn excite the Eu(III)-activated phosphors.

For the invention use can particularly suitably be made of a red emitting Eu(III)-activated phosphor selected from $Y(V_{1-x}P_x)O_4$, $(Y_{1-x}Gd_x)_2O_3$, $Y(V_{1-x-y}P_xB_y)O_4$ and a mixture of at least two thereof (in all said phosphors x, y=0.0-1.0), having a more reddish colour point and a shorter decay time than $(Y,Gd)BO_3:Eu$.

For the UV emitting phosphor use is made of $(Gd_{1-x-y}Y_xLu_y)PO_4$, or $(Gd_{1-x-y}Y_xLu_y)BO_3$ or $(Gd_{1-x-y}Y_xLu_y)B_3O_6$, $Ba(Gd_{1-x-y}Y_xLu_y)B_9O_{16}$, or $(Gd_{1-x-y}Y_xLu_y)_2SiO_5$, or $(Gd_{1-x-y}Y_xLu_y)_2Si_2O_7$, or $(Gd_{1-x-y}Y_xLu_y)MgB_5O_{10}$, or $(Gd_{1-x-y}Y_xLu_y)MgAl_{11}O_{19}$ or a mixture of at least two thereof (in all said phosphors x, y=0.0-0.99 and x+y<1).

Within the scope of the invention it is preferred that the UV emitting phosphor is sensitized by $Pr^{3+}$, $Nd^{3+}$ or $Bi^{3+}$ and has a strong absorption in the VUV range (100-200 nm) and emission in the UV range of 200 to 330 nm (UV-B).

In most preferred embodiments of the present invention $GdPO_4:Nd$, or $GdPO_4:Pr$, or $GdPO_4:Bi$ is applied as UV emitting phosphor. These compounds show a strong emission in the UV-B-range.

In the phosphor blend the emission lines in the UV-range will be absorbed almost completely b the red Eu(III)-activated phosphor. Consequently the energy yield, or electro-optical efficiency, of the red pixels is improved compared to a red pixel solely comprising the red-emitting phosphor.

A preferred embodiment is characterized in that the phosphor layer comprises a mixture of particles of the Eu(III)-activated phosphor and particles of the UV-emitting phosphor, converting VUV in UV-radiation.

It is preferred in this embodiment that the proportional quantity of the particles of the UV-emitting phosphor is in the range of 1-50% by weight, more preferred 5-30% by weight on bases of the weight of the Eu(III)-activated phosphor. Depending on the form of application, i.e. plasma display screen or xenon discharge lamp it may be preferred that the proportional quantity of the UV-phosphor is at least 2, 10, 15, 20, 25% by weight on bases of the weight of the Eu(III)-activated phosphor.

This embodiment can be realized in a simple manner by simply adding the UV-emitting phosphor to the suspension of the phosphor of which the phosphor layer is manufactured.

Another preferred embodiment is characterized in that the phosphor layer comprises a base layer, which contains the Eu(III)-activated phosphor, and a coating layer containing the UV-emitting phosphor. This results in the absorption of the VUV photons emitted by the gas discharge in the coating layer and subsequent excitation of the underlying Eu(III)-activated phosphor by the emitted UV-photons.

It is preferred in this embodiment that the base layer has a thickness in the range of 5-25 µm, more preferred 10-20 µm. Additionally in this embodiment it is preferred that the coating layer has a thickness in the range of 0.1-15 µm, more preferred 1-10 µm.

According to the present invention it may be also preferred that the base layer has a thickness of at least 2, 8, 12 or 15 µm. It may be also preferred that the coating layer has a thickness of at least 0.5, 2, 5, 8 or 12 µm.

The invention also relates to a luminescent screen provided with a phosphor layer comprising a phosphor blend of a red-emitting Eu(III)-activated phosphor and an UV-light emitting phosphor. This luminescent screen may be used in light emitting devices operating with a VUV emitting gas discharge, for example a xenon discharge lamp.

The invention further relates to a phosphor blend of a red emitting Eu(III)-activated phosphor and an UV-C and/or UV-B emitting (200-330 nm) phosphor.

The invention will now be explained in more detail below with reference to the figures, examples and embodiments.

Figure 1:
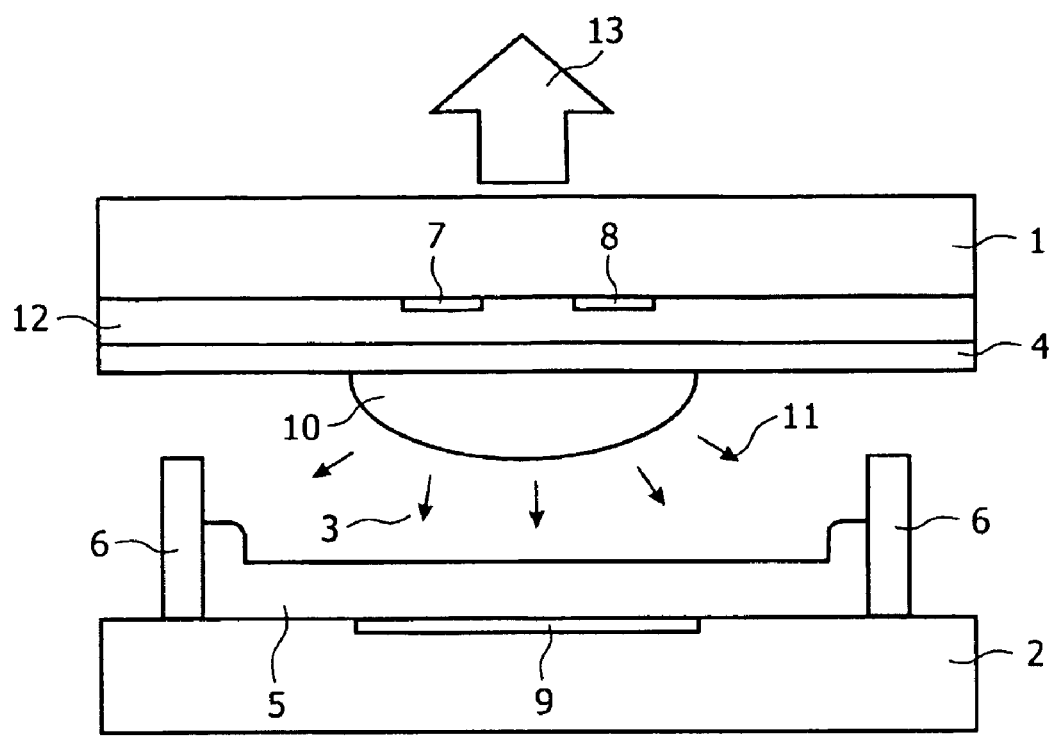
FIG. 1 shows the structure and the operating principle of a single plasma cell in an AC plasma display screen.

In FIG. 1, a plasma cell of an AC plasma display screen with planar parallel arrangement of a front plate 1 and a carrier plate 2 which are kept at a distance from each other and are hermetically closed at the periphery. The space between the two plates forms the discharge space 3, which is bounded by the protective layer 4 and the phosphor layer 5. Customarily, both the front plate 1 and the carrier plate 2 are made of glass. Individually drivable plasma cells are formed by a ribbed structure 6 of separating ribs. A plurality of transparent picture electrodes 7, 8 is arranged as strips on the front plate 1. The associated control electrodes 9 are provided on the carrier plate 2 at a right angle to said picture electrodes 7, 8, thus enabling a discharge to be ignited at every crossing point. The discharge space 3 is filled with a suitable discharge gas, for example xenon, or xenon containing gas, neon or a neon containing gas. The gas discharge is ignited between the picture electrodes 7, 8 on the front plate 1. In the discharge space 3, the gas is ionized and plasma 10 is formed, which emits VUV radiation 11. To preclude direct contact between the plasma 10 and the picture electrodes 7, 8 the latter are covered with a dielectric layer 12 and a protective layer 4. The spectral intensity of the gas discharge changes in dependence upon the composition of the gas in the plasma cell. Gas mixtures containing less than 30 vol. % xenon emit substantially resonance radiation at 147 nm, gas mixtures containing more than 30 vol. % xenon emit predominantly excimer radiation at 172 nm. The emitted UV radiation excites the pixel structured containing red, green and blue phosphors which in turn emit light in the visible range 13, resulting in a perceived colour. The pixels of the plasma display screen in the three primary colours, red, green and blue are formed by a phosphor layer 5 on at least a part of the carrier plate and/or the walls of the separating ribs in the plasma cells. Three adjacent plasma cells form a pixel, which enables all colours to be reproduced by mixing the three primary colours.

Figure 2:
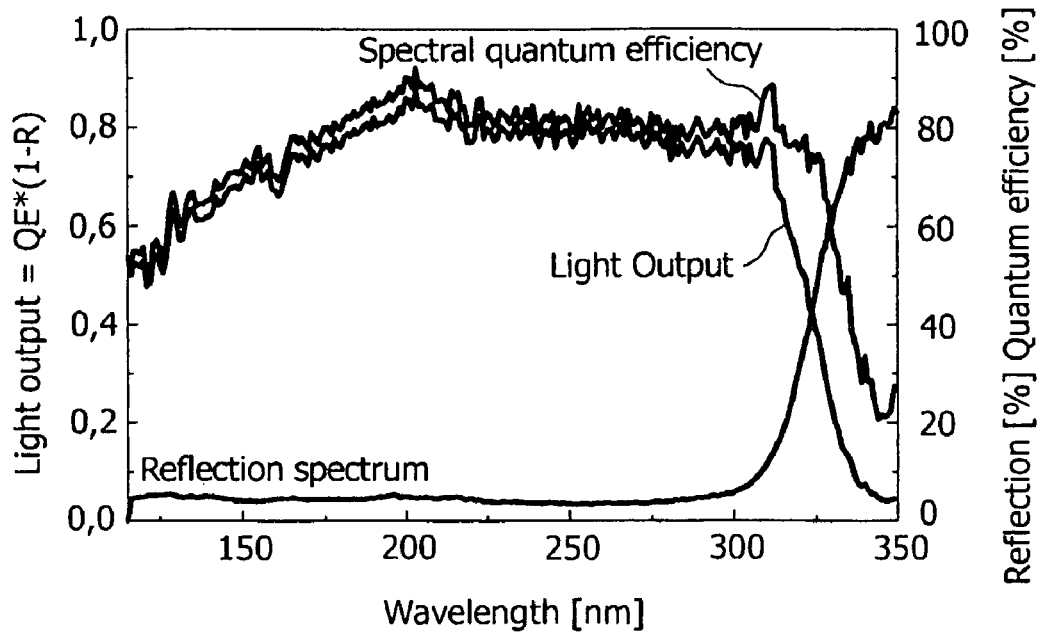
FIG. 2 shows the light output, reflection, and quantum efficiency as function of wavelength of Y(V,P)O$_4$:Eu.
Figure 3:
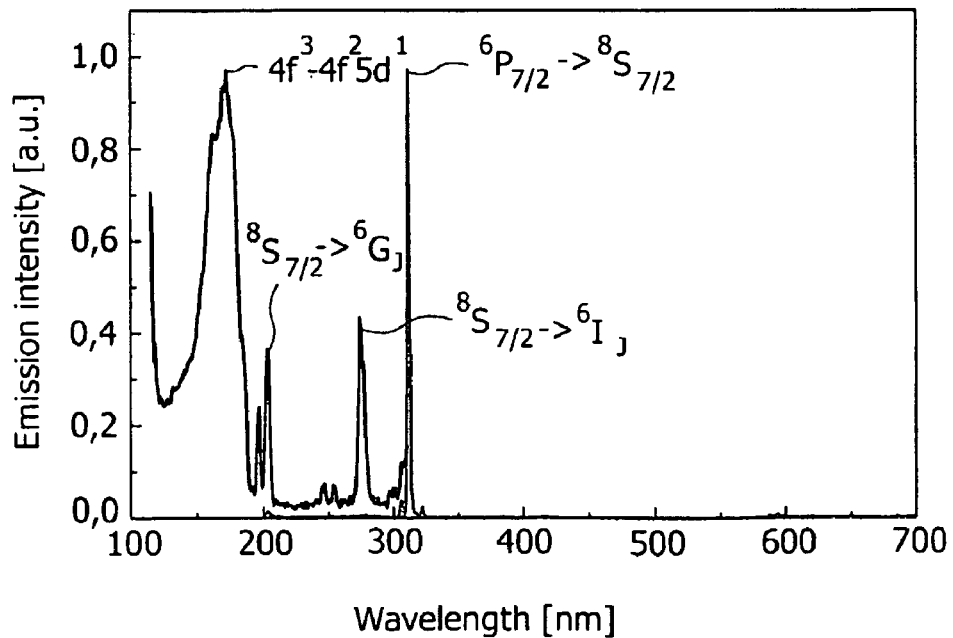
FIG. 3 shows the excitation and emission spectrum of GdPO$_4$:Nd.

The phosphor layer to generate the red colour radiation is composed of a phosphor blend comprising a red emitting Eu(III)-activated phosphor and an UV-B or UV-C emitting (200-330 nm) phosphor. The VUV photons emitted by the Xe/Ne discharge in the plasma cell are converted to UV-C/UV-B photons, which in turn excite the red emitting Eu(III)-activated phosphor. FIG. 3 shows the excitation in the VUV range and the strong emission line of GdPO$_4$:Nd at 310-315 nm. The UV photons emitted by the UV-emitting phosphor are almost completely absorbed by the Eu(III)-activated phosphor. FIG. 2 shows the light output, reflection, and quantum efficiency as function of wavelength of Y(V,P)O$_4$:Eu.

A plasma display screen according to the present invention, applying a phosphor blends for the red emitting pixels comprising an Eu(III)-activated phosphor and an UV emitting Gd$^{3+}$ phosphor shows an improved colour point and colour saturation and the shorter decay time of the red pixels, whereby the efficiency is also improved compared to the use of the respective single red emitting Eu(III)-activated phosphor.

Moreover the improved colour point and colour saturation has an influence not only on the red tones but also on all intermediate tones on the red-green and blue-red lines which become available as a result of the enlargement of the display triangle in the red range. Accordingly a more faithful display of many colour tones is possible, resulting in a visible enhancement of the display quality. In addition, the colour contrast under bright ambient light conditions is increased.

The application of the invention is not limited to this type of plasma display screen, but also comprises for example, DC colour plasma display screens and monochromatic AC and DC plasma display screens.

The application of the invention also comprises other light emitting devices which operate with plasma emitting VUV-light such as, for example cylindrical, planar or curved xenon discharge lamps for illumination purposes (e.g. LCD backlighting or X-Ray image illumination). Lamps according to the invention show an improved colour rendering in particular for the red colours and for lamps with a low colour temperature.

The Eu(III)-activated phosphor and UV-emitting phosphor used for the phosphor blend according to the invention are prepared in accordance with conventional methods, for example by means of a solid state reaction. In these methods oxides or carbonates are used as the starting compounds. They are mixed, ground and subsequently sintered. In this manner phosphors having a uniform crystal structure are obtained as fine grain particles. Also sol-gel or solution methods can be used for the preparation of the phosphors.

TABLE 1

Eu(III)-activated phosphor ($0.0 \leq x \leq 0.99$) having a more reddish colour point than (Y,Gd)BO$_3$:Eu.

| Phosphor | $\tau_{1/10}$ [ms] | Color point x | Color point y |
|---|---|---|---|
| Y$_2$O$_3$:Eu | 2.5 | 0.642 | 0.344 |
| YVO$_4$:Eu | 3.5 | 0.658 | 0.326 |
| Y(V$_{1-x}$P$_x$)O$_4$:Eu | 3.5 | 0.662 | 0.328 |
| (Y$_{1-x}$Gd$_x$)$_2$O$_3$:Eu | 2.5 | 0.650 | 0.337 |

Example 1

To manufacture $(Y_{0.495}Gd_{0.495})PO_4:Nd(1\%)$, a quantity of 20.00 g (55.17 mmol) $Gd_2O_3$, 12.46 g (55.17 mmol) $Y_2O_3$ and 0.38 g (1.12 mmol) $Nd_2O_3$ were suspended in distilled water. Under stirring 26.99 g (234.06 mmol) $H_3PO_4$ (85%) was added and the suspension was stirred for 24 h at ambient temperature. The suspension was concentrated at a continuous flash evaporator and dried at 100° C. and the residue was grounded in a mortar. Then 0.50 g LiF was added and the powder was ground again. Within 2 h the mixture is heated to 800° C. and calcinated for 2 h with exposure to air. Subsequently within 2 h the mixture is heated to 1000° C. and again calcinated for 2 h. After cooling to ambient temperature, the phosphor resulted as a white solid. The phosphor was stirred for 6 h with 160 ml $HNO_3$ (65%) and 640 ml of distilled water at 60° C. The phosphor was filtered off, washed and dried at 100° C. A white powder was obtained.

Example 2

To manufacture $(Y_{0.495},Gd_{0.495})PO_4:Pr(1\%)$, a quantity of 20.00 g $Gd_2O_3$ (55.17 mmol), 12.46 g $Y_2O_3$ (55.17 mmol) and 0.38 g (0.37 mmol) $Pr_6O_{11}$ were suspended in distilled water. Under stirring 26.99 g $H_3PO_4$ (85%) was added and the suspension was stirred for 24 h at ambient temperature. The suspension was concentrated at a continuous flash evaporator and dried at 100° C. The residue was grounded in a mortar. Then 0.50 g LiF was added and the mixture was grounded again. Within 2 h the mixture was heated to 800° C. and calcinated for 2 h with exposure to air. Subsequently within 2 h the mixture was heated to 1000° C. and again calcinated for 2 h. After cooling to ambient temperature, the phosphor resulted as a white solid. The phosphor was stirred for 6 h with 160 ml $HNO_3$ (65%) and 640 ml of distilled water at 60° C. The phosphor was filtered off, washed acid-free and dried at 100° C. A white powder is obtained.

To manufacture the phosphor layer consisting of the phosphor blend use can be made of dry-coating methods, for example electrostatic deposition or electro statically assisted dusting, as well as wet-coating methods, for example screen printing, dispenser methods, wherein a suspension is introduced using a nozzle moving along the channels, or sedimentation from the liquid phase.

For wet, flush coating methods, the phosphors are dispersed in water, an organic solvent, if necessary in combination with a dispersing agent, a surfactant and an antifoaming agent or a binder preparation. Organic and inorganic binders capable of withstanding an operating temperature of 250 C without being subject to decomposition, embrittlement or discoloration can suitably be used as the binder preparations for plasma display screens.

Embodiment 1

First a suspension of 20 g $Y_2O_3$:Eu and 2 g of $GdPO_4$:Pr in butyl acetate was prepared, to which additives such as an organic binder and a dispersing agent, (nitrocellulose, nano-particular $Al_2O_3$, ethyl acetate) were added. The suspension was applied to a carrier plate 2 by means of silk-screen printing and dried. Subsequently, the printing and drying step was repeated for the other two phosphor types with the emission colours green and blue.

All additives remaining in the phosphor layers 5 were removed by a thermal treatment of the carrier plate 2 at 400 to 600° C. in an atmosphere containing oxygen. The carrier plate 2 was then used for manufacturing a plasma display screen.

The suspension was also used for manufacturing of a cylindrical discharge lamp. A suitable process for this is preferably an up-flush coating process. The suspension of the phosphor in butyl acetate with nitrocellulose as binder and alon-c (i.e. nano-particular $Al_2O_3$) is provided on the inner side of the discharge vessel in form of a tube of standard glass.

The additives were removed by a thermal treatment at 400-600° C. The glass tube was subsequently filled with 200 mbar xenon gas and sealed. After the Al strip electrodes were applied and the lamp can be operated by means of a standard circuit for dielectric barrier discharge lamps.

Embodiment 2

First a suspension of $YVO_4$:Eu in butylacetate was prepared, to which additives such as an organic binder and a dispersing agent were added (nitrocellulose, nano-particular $Al_2O_3$, ethyl acetate). The suspension was applied on a carrier plate 2 by means of silk-screen printing and dried.

Subsequently, a suspension of $GdPO_4$:Nd in butyl acetate was prepared, to which additives such as an organic binder and a dispersing agent were added (nitrocellulose, nano-particular $Al_2O_3$, ethyl acetate). This suspension was provided by silk-screen printing on those portions of the carrier plate 2 on which previously a layer of $YVO_4$:Eu had been provided, and was dried. Thus a coating layer of $GdPO_4$:Nd was present on top of the base layer of $YVO_4$:Eu.

Subsequently suspensions of phosphor types with the emission colours green and blue were prepared, to which respective additives such as an organic binder and a dispersing agent were added. These suspensions were applied on the carrier plate 2 by means of silkscreen printing and dried.

All additives remaining in the luminescent layers were removed by thermal treatment of the carrier plate 2 at 400 to 600° C. in an atmosphere containing oxygen. Such a carrier plate 2 was then used for manufacturing a plasma display screen.

The invention claimed is:

1. A luminescent screen provided with a phosphor layer comprising:
   a red-emitting Eu(III)-activated phosphor; and
   an UV-light emitting phosphor, wherein the red-emitting Eu(III)-activated phosphor includes $Y(V_{1-x}P_x)O_4$:Eu, with $0.0 \leq x \leq 1.0$, wherein the UV-emitting phosphor is selected from a group consisting of $(Gd_{1-x-y}Y_xLu_y)PO_4$, $(Gd_{1-x-y}Y_xLu_y)BO_3$, $(Gd_{1-x-y}Y_xLu_y)B_3O_6$, $Ba(Gd_{1-x-y}Y_xLu_y)B_9O_{16}$, $(Gd_{1-x-y}Y_xLu_y)_2SiO_5$, $(Gd_{1-x-y}Y_xLu_y)_2Si_2O_7$, $(Gd_{1-x-y}Y_xLu_y)MgB_5O_{10}$, $(Gd_{1-x-y}Y_xLu_y)MgAl_{11}O_{19}$, or a mixture of at least two thereof, with $0.0 \leq x \leq 0.99$ and $0.0 \leq y \leq 0.99$ and $x+y<1$.

2. The luminescent screen as claimed in claim 1, wherein the UV-emitting phosphor is sensitized by $Pr^{3+}$, $Nd^{3+}$ or $Bi^{3+}$.

3. The luminescent screen as claimed in claim 1, wherein the phosphor layer comprises a mixture of particles of the red-emitting Eu(III)-activated phosphor and particles of the UV-emitting phosphor.

4. The luminescent screen as claimed in claim 3, wherein a proportional quantity of the particles of the UV emitting phosphor is in a range of 1-50% by weight based on a weight of the red-emitting Eu(III)-activated phosphor.

5. The luminescent screen as claimed in claim 4, wherein a proportional quantity of the particles of the UV emitting phosphor is in a range of 5-30% by weight based on a weight of the red-emitting Eu(III)-activated phosphor.

6. The luminescent screen as claimed in claim 1, wherein the phosphor layer comprises a base layer, which contains the red-emitting Eu(III)-activated phosphor and a coating layer, which contains the UV-emitting phosphor.

7. The luminescent screen as claimed in claim 6, wherein the base layer has a thickness in a range of 10-20 μm and the coating layer has a thickness in a range of 1-10 μm.

* * * * *